April 8, 1952     R. M. NARDONE     2,592,320
TORQUE LIMITING MEANS FOR ENGINE STARTERS AND THE LIKE
Filed Aug. 8, 1947
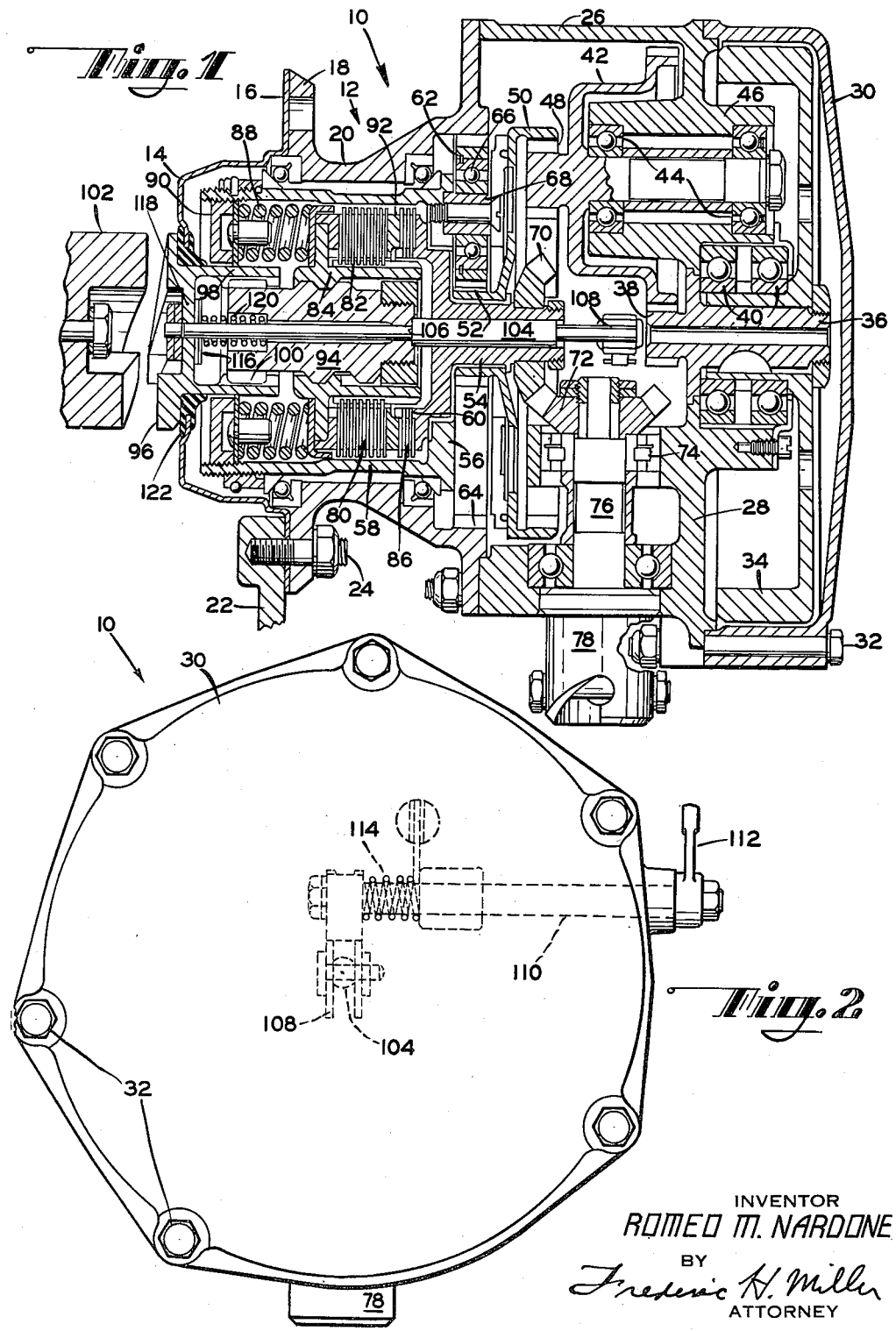
INVENTOR
ROMEO M. NARDONE
BY
Frederic H. Miller
ATTORNEY Patented Apr. 8, 1952

2,592,320

UNITED STATES PATENT OFFICE 2,592,320

TORQUE LIMITING MEANS FOR ENGINE STARTERS AND THE LIKE

Romeo Morton Nardone, Teaneck, N. J., assignor to Bendix Aviation Corporation, Teterboro, N. J., a corporation of Delaware Application August 8, 1947, Serial No. 767,617

4 Claims. (Cl. 123—179)

The invention hereof relates to engine starters and the like, and particularly to novel torque limiting means therefor.

Heretofore, it has been usual to provide torque limiting means, between a gear train and a jaw member of an engine starter or the like, for protecting parts of the starter from injury incident to heavy starting loads and engine backfire.

Also, it has been usual to provide a starter with means whereby it may be operated from a source of energy independently of a source in the starter, in which case there has not been, so far as the inventor hereof is aware, any similar torque limiting means for protecting the starter parts from injury caused by excessive application of energy from such independent source.

Among the objects of the present invention are to avoid injury to the starter from the latter cause, and to do so by novel effective means.

Another object is to provide a multi-part torque limiting unit, the parts of which are adapted to be operated independently of each other.

Another object is to provide a unit as aforesaid in which the independently operative parts are of different torque limiting values.

Another object is to provide a unit as aforesaid having a single means for adjusting the torques of its independent parts.

Another object is to provide torque limiting means of the above-indicated character which is simple and durable in construction, economical to manufacture and effective in its operation.

The above and other objects and features of the invention will appear more fully hereinafter from a consideration of the following description taken in connection with the accompanying drawing wherein one embodiment of the invention is illustrated by way of example.

In the drawing:

Figure 1 is a broken top view, partially in section and partially in elevation, of an engine starter embodying a torque limiting unit of the invention; and Figure 2 is a partial end view of the starter of Figure 1 taken from the right thereof.

Referring to the drawing, a starter 10 comprises a housing 12 including a baffle plate end portion 14 having a flange 16 secured to a flange 18 of a housing portion 20 and to a mounting portion 22, as by bolts 24. The housing portion 20 is secured to a housing portion 26 having a partition 28, Figure 1, to which a cover 30 is secured, as by bolts 32. A flywheel or inertia member 34 is keyed to a shaft 36, having a pinion 38 or input element of a gear train and journaled in anti-friction bearings 40 mounted on the partition 28. A bell gear 42, journaled by anti-friction bearings 44 in a bearing support 46 of the partition 28 and engaging the pinion 38, has a pinion 48 engaging a rotatable orbital gear 50 having a sun gear portion 52 journaled about a tubular sleeve 54, which extends through an end wall 56 of a barrel 58, and has a tubular portion 60 in the barrel 58 for a purpose later pointed out.

Planet gears 62, engaging the sun gear 52 and a stationary orbital gear 64 of the housing portion 20, are journaled by anti-friction bearings 66 on trunnions 68 protruding from the barrel end wall 56.

A bevel gear 70, splined to the sleeve 54 for rotation therewith, engages another input or bevel gear 72 of the train, journaled by anti-friction bearings 74 in portions of the partition 28, which gear 72 is mounted on a shaft 76 having secured thereto, exteriorly of the housing 26, a member 78 adapted to receive a hand crank or other means.

A multi-part torque limiting friction disc pack 80, in the barrel 58, has discs 82 of one part splined to the barrel and to an axially stationary rotatable hollow nut 84, respectively, and discs 86 of the other part connected to the barrel, and through the tubular portion 60, to the bevel gear 70, respectively, all of the discs being adjusted relative to each other by springs 88 and a ring nut adjusting means 90 screw threaded to the barrel therein. A ringlike pressure plate 92 is disposed between the discs 82 and 86.

A screw shaft 94, or output element of the gear train, has long lead thread connection to the nut 84 therein, and a shoulder adapted to engage a shoulder of the nut, after predetermined axial movement relative thereto for rotation therewith.

A jaw or starter output member 96 comprises a screw shaft securing length or shank portion 98 at one end having a spline connection 100 to the screw shaft 94 and a jaw portion at the other end for cooperation with an engine jaw 102.

A mesh rod 104, having portions of different diameter providing a shoulder 106 for engagement with one end of the screw shaft 94, is pivotally connected at one end to a clevis at one end of a lever 108, which is connected to a rod 110, see Figure 2, journaled in the housing portion 26 and carrying a bell crank lever 112 exteriorly of the housing. A spring 114, coiled about the rod 110, acts oppositely against the housing and the lever 108 to bias the mesh rod 104 to the left, as seen in Figure 1. The mesh rod has its other end provided with a sliding seal 116 of washer-like character normally held against a web 118 of the jaw member 96 by a spring 120 between the web and a shoulder in the screw shaft.

The starter is sealed against the admission of moisture and other liquids by a ring seal 122 around the shank 98, which has rotative and axial sliding contact with the seal.

In operation, with the parts shown related as they are either when the engine is running or not running, if it is not running, and it is desired to start it, a hand crank or other means may be attached to and operated to rotate the member 78. Rotation of the member 78 is transmitted, through the shaft 76, to the bevel gear 72, the bevel gear 70, the sleeve 54, the discs 86, the discs 82, the barrel 58, the planet gears 62, the stationary orbital and rotatable sun gears 64 and 52, respectively, the rotatable orbital gear 50, the pinion 48, the bell gear 42, the pinion 38 and the shaft 36 to the flywheel 34. If the force applied to the member 78 is excessive to a degree likely to injure the starter parts, irrespective of starting the engine, the discs 86 slip. However, if no such excessive force is applied or when it ceases, turning of the bevel gear 72 by the proper force is continued until the flywheel 34 attains a predetermined speed sufficient to start the engine. At this point, the operator should ordinarily stop turning of the member 78, but whether he does or not, he should, at substantially the instant the flywheel attains its engine starting speed, operate the bell crank 112 to move the mesh rod 104 against the bias of the spring 114 to the left, as viewed in Figure 1. Such movement causes the shoulder 106 to move the screw shaft 94 and the jaw member 96 to the left through the intermediary of the spring 120, to engage the starter jaw member 96 to the engine jaw member 102, whereupon the stored energy of the flywheel 38 comes into play to turn the jaw members.

If the engine jaw member 102 imposes excessive torque, or the engine backfires, the resultant shock is absorbed by the portion 82 of the pack 80 to the left of the plate 92.

As soon as the engine starts, the lever 112 should be released but if it is not released quickly, the engine jaw 102 will override the starter jaw 96 against the action of the spring 120 until release of the bell crank 112, whereupon the spring 114 will return the parts to the retracted or initial positions shown.

The parts 82 and 86 of the pack 80 are of different torque limiting characteristics, in this instance, with the part 86 being adapted to slip in response to an applied force of considerably smaller value than the value at which the part 82 slips.

Although only one embodiment of the invention has been illustrated and described, various changes in the form and relative arrangements of the parts may be made to suit requirements.

What is claimed is:

1. In an engine starter comprising a flywheel, a flywheel pinion, a rotatable orbital gear having a sun gear, a bell gear engaging said pinion and having a pinion engaging said orbital gear, a stationary orbital gear, a barrel, planet gears carried by said barrel between said stationary orbital gear and said sun gear, an axially stationary rotatable nut in said barrel, a screw shaft having long lead thread connection to said nut thereon, a starter jaw member having a shank splined to said shaft, means including mesh rod means adapted to engage said starter jaw member to an engine jaw element, a sleeve around said mesh rod, a bevel gear carried by and rotatable with said sleeve, a second bevel gear engaging said first bevel gear, and means providing for operating said second bevel gear, the combination of a multi-part torque limiting friction disc pack in said barrel having discs of one part splined to said barrel and said nut, respectively, and discs of another part connected to said barrel and said sleeve, respectively.

2. In an engine starter and the like comprising an inertia member, a pinion rotatable with said member, a rotatable orbital gear having a sun gear, a gear engaging said pinion and having a pinion engaging said orbital gear, a stationary orbital gear, a barrel, planet gears carried by the barrel between said stationary orbital and sun gears, an axially stationary rotatable nut in said barrel, a sleeve member coaxial with said orbital gears, a bevel gear carried by said sleeve member, a second bevel gear engaging said first bevel gear, mesh rod means, and a screw shaft having long lead thread connection to said nut thereon, the combination of a multi-part torque limiting friction disc pack in said barrel having discs of one part splined to said barrel and said nut, respectively, and discs of another part connected to said barrel and said sleeve member, respectively.

3. In an engine starter and the like comprising an inertia member, a starter jaw member, means adapted to engage said starter jaw member to an engine element, transmission means including a gear train connected to said inertia member, and driving means, the combination of a multi-part torque limiting unit including elements of one part connecting said starter jaw member and the transmission means, and elements of another part connecting the transmission means to said driving means.

4. In a device comprising an inertia member, a jaw member, means adapted to engage said jaw member to an element, transmission means including a gear train connected to said inertia member, and driving means, the combination of torque limiting means connecting the jaw member and the transmission means, and torque limiting means connecting the transmission means to said driving means.

ROMEO MORTON NARDONE.

REFERENCES CITED

The following references are of record in the file of this patent:

UNITED STATES PATENTS

| Number | Name | Date |
| --- | --- | --- |
| 1,709,586 | Lansing | Apr. 16, 1929 |
| 2,163,829 | Chilton | June 27, 1939 |